Oct. 29, 1929.  J. A. T. OBRIG ET AL  1,733,235
SPECTACLES
Filed Jan. 28, 1928
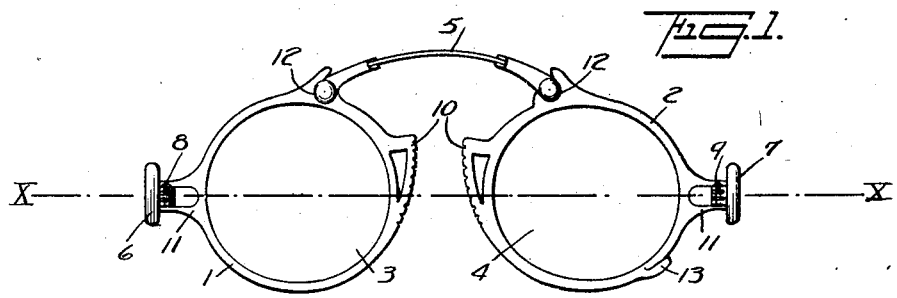
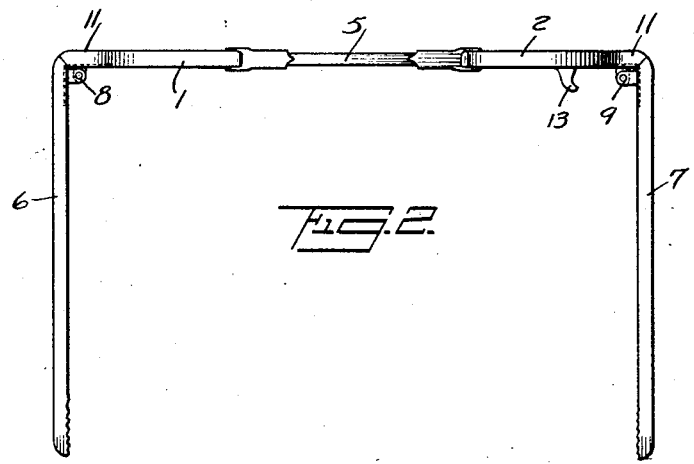
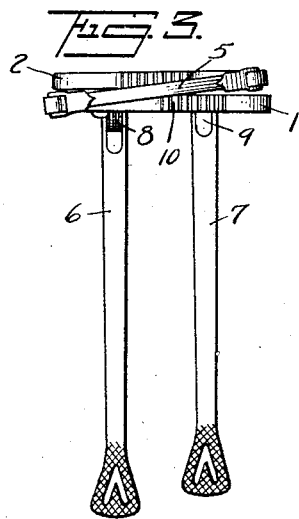
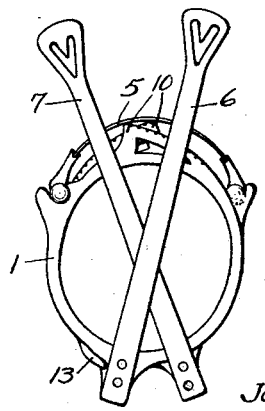
INVENTORS
Jacob A. Theodore Obrig
and Edwin P. Hutten.
BY
ATTORNEY Patented Oct. 29, 1929

1,733,235

UNITED STATES PATENT OFFICE

JACOB A. THEODORE OBRIG, OF SUMMIT, AND EDWIN P. HUTTEN, OF RUTHERFORD, NEW JERSEY

SPECTACLES

Application filed January 28, 1928. Serial No. 250,097.

This invention relates to spectacles or eyeglasses and one object of the invention is to provide an improved frame structure whereby the spectacles may be folded to very compact and convenient form of carrying. A further object of the invention is to provide an improved arrangement whereby accidental opening of the folded frame is guarded against. Other objects of the invention will be readily understood from following particular description of a preferred form of the invention with reference to the accompanying drawing whereon Fig. 1 is an elevation looking on the inner face of the spectacles with the parts in position for use; Fig. 2 is a plan view of the same; Fig. 3 is a similar view but showing the frame partly folded, and Figs. 4 and 5 are an elevation and side view respectively showing the spectacles completely folded.

The frame comprises two rims 1, 2 for carrying the lenses 3, 4 and the rims are connected to each other by a spring bow or bridge piece 5 and have short folding temples or supports 6, 7 connected thereto by means of metal hinges 8, 9. Each of the rims 1, 2 is formed with an integral nose piece 10 and with an integral projection 11 for the attachment of the hinge 8 or 9. These projections 11 are so placed in a horizontal center line X—X extending through the centers of the lenses 3, 4 when the spectacles are open, that they serve to ensure true positioning when the spectacles are being fitted with cylindrically corrected lenses. The bow or bridge piece 5 is hinged to the rims 1, 2 at 12 and is of spring metal so that the rims 1, 2 may be conveniently folded into overlapping relation. Integral with the rim 2 is a projecting hook or lug 13 for the reception of the projection 11 on the rim 1 when the rims are in the overlapping or folded position. The hinges 8, 9 then permit of the temples 6, 7 being folded over the overlapping rims, and the said hinges are so arranged that the temple 7 may be folded flat upon the rim 1 so that it prevents accidental disengagement of the projection 11 on the rim 1 from the hook 13. The second temple 6 is then folded upon the temple 7 so that the spectacles are in convenient and compact form for carrying in a case of very small dimensions.

It will be understood that our invention may be carried out in various ways and we do not desire to limit ourselves to the form and arrangement described above and shown on the accompanying drawing but the construction may be modified within the scope of the appended claims.

What we claim is:—

1. A folding frame for spectacles comprising two lens carrying rims, an integral projecting member on each rim, a temple permanently hinged to each of said projecting members, a spring bridge connecting the two rims, and a hook member integral with one of the rims for engaging the said projecting member on the other rim and retaining the rims in folded overlapping relation.

2. A folding frame for spectacles comprising two lens carrying rims, a projecting member on each rim, a spring bridge hinged to both rims, an integral hook member projecting from one of the rims and adapted to engage the projecting member on the other rim when the frame is folded, and a temple permanently hinged to each projecting member and adapted to fold upon the folded rims.

3. A folding frame for spectacles comprising two lens carrying rims, a projecting member on each rim, a connecting spring bridge hinged to the rims, a hook member projecting from one of the rims at right angles to the lens to engage the projecting member on the other rim when the frame is folded, a temple hinged to each of said projecting members so as to fold upon the rims in angular and overlapping relation to each other.

4. A folding frame for spectacles comprising two lens carrying rims, a projecting member on each rim, a bridge connecting the two rims with the said projecting members both in a horizontal center line passing through the centers of the lenses when the spectacles are in position for use, a hook device on one of the rims projecting at right angles from the lens and adapted to engage the projecting member on the other rim to retain the rims in overlapping relation, and temples permanently hinged to the said projecting members and adapted to fold upon the overlapping rims.

5. A folding frame for spectacles comprising two lens carrying rims, a projecting members on each rim, a bridge connecting the two rims with the said projecting members both in a horizontal center line passing through the centers of the lenses when the spectacles are in position for use, a hook device on one of the rims projecting at right angles from the lens and adapted to engage the projecting member on the other rim to retain the rims in overlapping relation, a temple permanently hinged to the projecting member on the rim carrying the said hook device and adapted to fold over the other rim to retain the said hook device and projecting member in locking engagement with each other, and a temple hinged to the said hook engaging member and adapted to fold over the first mentioned temple in angular relation thereto.

In testimony whereof we have signed our names to this specification.

JACOB A. THEODORE OBRIG.
EDWIN P. HUTTEN.